(12) United States Patent
Jantz et al.

(10) Patent No.: US 6,881,151 B1
(45) Date of Patent: Apr. 19, 2005

(54) UNIVERSAL JOINT

(75) Inventors: Carl Jantz, 20555 Pugh Rd. NE., Poulsbo, WA (US) 98370; Randy Lyman, Everett, WA (US)

(73) Assignee: Carl Jantz, Poulsbo, WA (US)

( * ) Notice: Subject to any disclaimer, the term of this patent is extended or adjusted under 35 U.S.C. 154(b) by 0 days.

(21) Appl. No.: 10/307,243

(22) Filed: Nov. 26, 2002

Related U.S. Application Data (60) Provisional application No. 60/333,542, filed on Nov. 27, 2001.

(51) Int. Cl.$^7$ .............................. F16N 1/00; F16D 3/40
(52) U.S. Cl. ........................................ 464/14; 464/128
(58) Field of Search .............................. 464/11, 14, 13, 464/128, 132, 136, 117, 905; 384/625, 925

(56) References Cited

U.S. PATENT DOCUMENTS

| | | | |
|---|---|---|---|
| 1,216,769 A | * | 2/1917 | Blood ........................... 464/8 |
| 1,226,688 A | | 5/1917 | Nedoma |
| 1,249,545 A | | 12/1917 | Sponsel |
| 1,253,919 A | | 1/1918 | Williams |
| 1,357,320 A | | 11/1920 | Hardy |
| 1,366,039 A | | 1/1921 | Thiemer |
| 1,381,600 A | | 6/1921 | Thiemer |
| 1,382,720 A | | 6/1921 | Fox et al. |
| 1,421,617 A | | 7/1922 | Thiemer |
| 1,841,349 A | | 1/1932 | Culbertson |
| 1,926,858 A | | 9/1933 | Peters |
| 1,968,787 A | * | 7/1934 | Slaght et al. .................. 464/14 |
| 2,217,082 A | | 10/1940 | Swenson |
| 3,087,314 A | | 4/1963 | Jarvis et al. |
| 3,216,087 A | * | 11/1965 | Harrington ............... 29/898.11 |
| 4,615,148 A | | 10/1986 | Harper, Jr. |
| 5,695,405 A | | 12/1997 | Kono |
| 6,315,455 B1 | * | 11/2001 | Tanaka et al. .............. 384/492 |

FOREIGN PATENT DOCUMENTS

JP 62-28169 2/1987

* cited by examiner

Primary Examiner—Kenn Thompson
(74) Attorney, Agent, or Firm—Christensen O'Connor Johnson Kindness PLLC (57) ABSTRACT

A universal joint (100) comprising a spider (102) having a trunnion (104) projecting outward from the spider is provided. A bearing (108) is disposed over a distal end of the trunnion with a lubricant passageway (110) disposed within the trunnion and in fluid communication with the bearing. A lubricant pressurizing system (112) is incorporated within the spider to bias or urge the lubricant through the lubricant passageway and toward the bearing. The trunnion may be tapered along its length and an outer edge (366) of the end of the trunnion may be radiused. The trunnion and/or bearing may further include a load carrying surface (114 and 158) comprised of a wear resistant material. The load carrying surface may be smooth or textured to retain a lubricant thereupon. The spider may include a plurality of cross grooves (126) and/or clearance radii (128) to aid in installation into the yoke.

48 Claims, 7 Drawing Sheets

«UNIVERSAL JOINT

CROSS-REFERENCE TO RELATED APPLICATION

This application claims the benefit of U.S. Provisional Application No. 60/333,542, filed Nov. 27, 2001, which is hereby expressly incorporated by reference.

FIELD OF THE INVENTION

The present invention relates generally to universal joints, and more specifically to universal joints formed to withstand high loads.

BACKGROUND OF THE INVENTION

A universal joint provides a means to couple two rotating shafts to one another in an end to end relationship despite the shafts not necessarily being in line with one another. In reference to automobiles, a pair of universal joints are often used to couple a rotating drive shaft at a first end to the output of a transmission or transfer case and at a second end to the input of a differential, which in turn drives the rear and or front wheels of the automobile. In front or four-wheel drive cars, universal joints are often employed to allow articulation between a pair of front axles extending in opposite directions from a front differential or transmission and a pair of stub axles carrying the wheels, thus permitting the front wheels to pivot to permit steerage.

Figure 1:
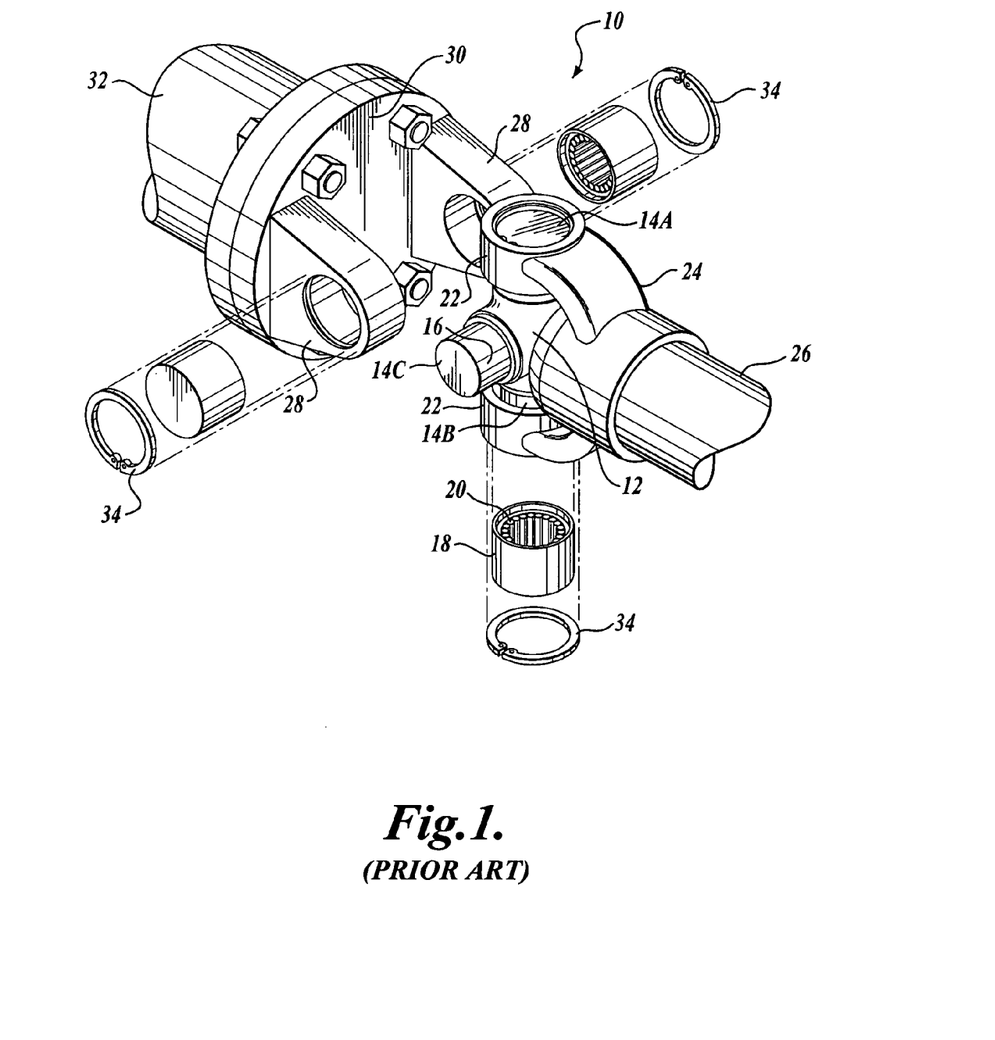
FIG. 1 is an exploded perspective view of a previously developed universal joint.

Referring to FIG. 1, a previously developed universal joint 10 is depicted. The universal joint 10 is comprised of a main body, referred to as a cross or a spider 12, having four co-planar trunnions 14 extending radially outward from the spider 12 at 90 degree intervals. Journals 16 are formed on the distal ends of the trunnions 14 to accept bearing cups 18 thereupon. Disposed between the bearing cups 18 and the journals 16 are a plurality of needle roller bearings 20 used to reduce friction as the trunnions 14 rotate within the bearing cups 18.

During installation, a first pair of collinear trunnions 14A and 14B are inserted within a pair of opposing bosses 22 of a first yoke 24 of a first drive shaft 26. A pair of bearing cups 18 and needle roller bearings 20 are then inserted into the bosses 22 so as to be received upon the journals 16 of the trunnions 14A and 14B. The bearing cups 18 are secured with retaining rings 34, as is well known in the art. A second pair of collinear trunnions 14C and 14D (not shown) are then inserted within a pair of opposing bosses 28 of a second yoke 30 of a second drive shaft 32. A second pair of bearing cups 18 and needle roller bearings 20 are then inserted into the bosses 28 so as to be received upon the journals 16 of the trunnions 14C and 14D (not shown). The bearing cups 18 are secured with retaining rings 34, as is well known in the art. Once the universal joint 10 is installed, the first drive shaft 26 may rotate with two degrees of freedom relative to the second drive shaft 32, each degree of freedom defined by one of the collinear pairs of trunnions 14A and 14B or 14C and 14D. Thus, the first drive shaft 26 may rotate at an angle relative to the second drive shaft 32 during rotation of the shafts 26 and 32 without binding.

Still referring to FIG. 1, although previously developed universal joints are effective at transferring loads between two non-aligned shafts, they are not without their limitations and problems. Although previously developed universal joints 10 are adequate for use in low load conditions, they tend to break down when subjected to high loads imposed during severe usage situations. One reason lies in the use of needle roller bearings 20. The needle roller bearings 20 of previously developed universal joints tend to concentrate the forces exerted between the journals 16 of the universal joint 10 and the bearing cups 18 along finite pressure lines. More specifically, the forces exerted between the journals 16 and the bearing cups 18 are concentrated along a first contact line formed between the inner surface of the bearing cups 18 as they engage the outer surfaces of the roller needle bearings 20, and a second contact line formed by the outer surfaces of the journals 16 as they engage the roller needle bearings 20. Thus, during high loads, the concentration of large forces upon the minimal contact area represented by the contact lines often causes premature failure of the universal joint 10.

Further, the grease delivery systems of previously developed universal joints are inadequate to supply grease at sufficiently high pressures to maintain the bearing cups in an adequate state of lubrication when subjected to high loads. Moreover, existing universal joints 10 depend on centrifugal forces to supply grease to the bearing cups. The pressure created through centrifugal forces may be insufficient to adequately pressurize the grease for high load conditions. This is especially true for universal joints 10 exhibited to high loads and low revolution (i.e. low RPM) conditions. Further still, the manner of installation of existing universal joints limits the size of the spider that may be used, thus limiting the strength of the universal joint, thereby increasing the potential of failure of the universal joint. Further yet, under high torque conditions, previously developed trunnions tend to dig into the needle roller bearings as the bearing cups cant and/or deform under the load.

SUMMARY OF THE INVENTION

In accordance with one embodiment of the present invention, a universal joint including a spider having at least one trunnion projecting outward from the spider is provided. The universal joint further includes a bearing disposable on a distal end of the trunnion, a lubricant passageway disposed within the trunnion and in fluid communication with the bearing, and a lubricant delivery system disposed within the spider and adaptable to urge a lubricant when present within the lubricant passageway toward the bearing.

The trunnion may be tapered toward the distal end of the trunnion. The outer edge of an end surface of the trunnion may be radiused. The lubricant delivery system may include a resilient member adaptable to act upon the lubricant to pressurize the lubricant. The bearing may be further comprised of a load carrying surface for engagement with the trunnion, wherein the load carrying surface is comprised of a wear resistant material.

The bearing may further include a load carrying surface for engagement with the trunnion, wherein the load carrying surface is textured to retain a lubricant thereupon. The trunnion may include a surface for receiving the bearing comprising a wear resistant material. The spider may include a plurality of cuts positioned on the outer surface of the spider to provide additional clearance during installation of the universal joint upon a yoke. The distal end of the trunnion may include a clearance radius to provide additional clearance during installation of the universal joint upon a yoke. The wear resistant materials of the universal joint may include a material selected from the group consisting of chromium nitride, titanium nitride, titanium carbonitride, zirconium nitride, aluminum titanium nitride, titanium aluminum, zirconium nitride, and aluminum oxide.

BRIEF DESCRIPTION OF THE DRAWINGS

The foregoing aspects and many of the attendant advantages of this invention will become more readily appreciated by reference to the following detailed description, when taken in conjunction with the accompanying drawings, wherein.

DETAILED DESCRIPTION OF THE PREFERRED EMBODIMENT

Figure 2:
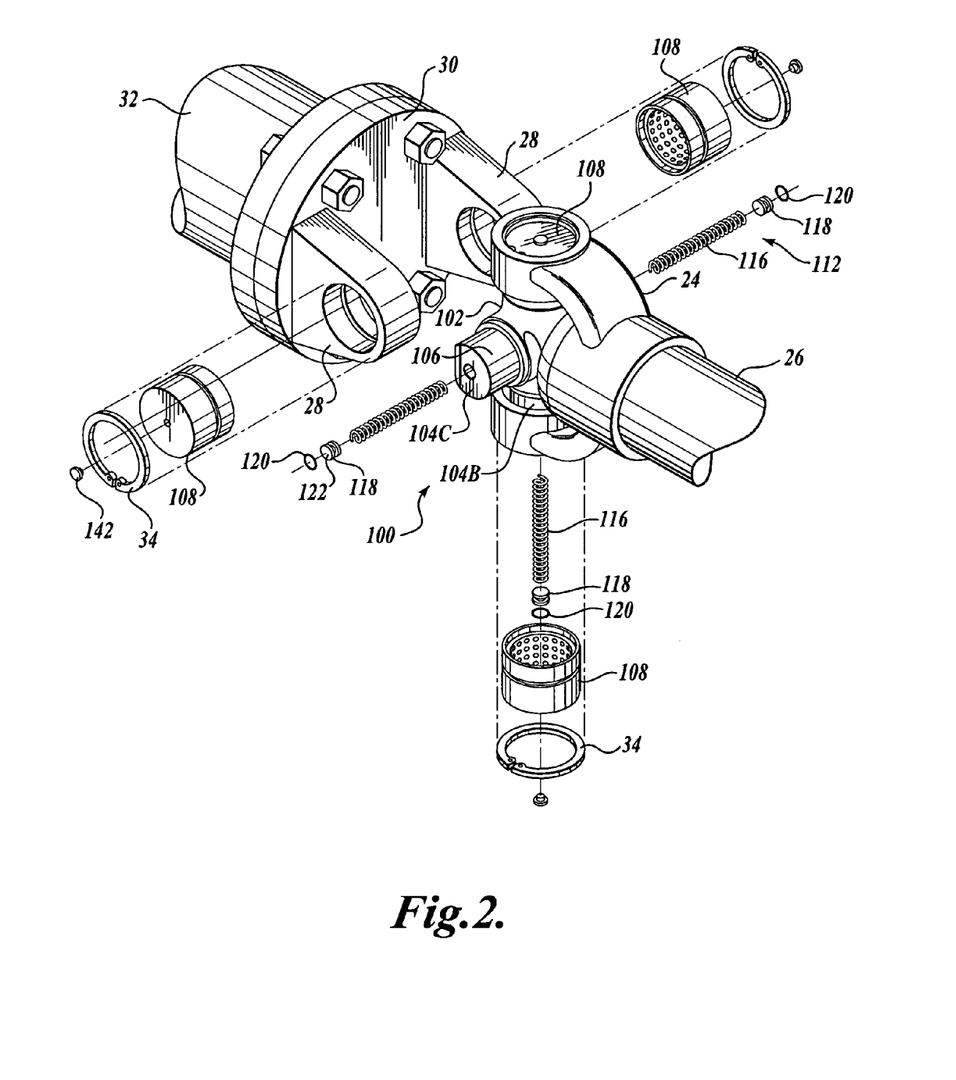
FIG. 2 is an exploded perspective view of one embodiment of a universal joint formed in accordance with the present invention, shown in relation to a first and a second drive shaft.
Figures 3, 4, 5:
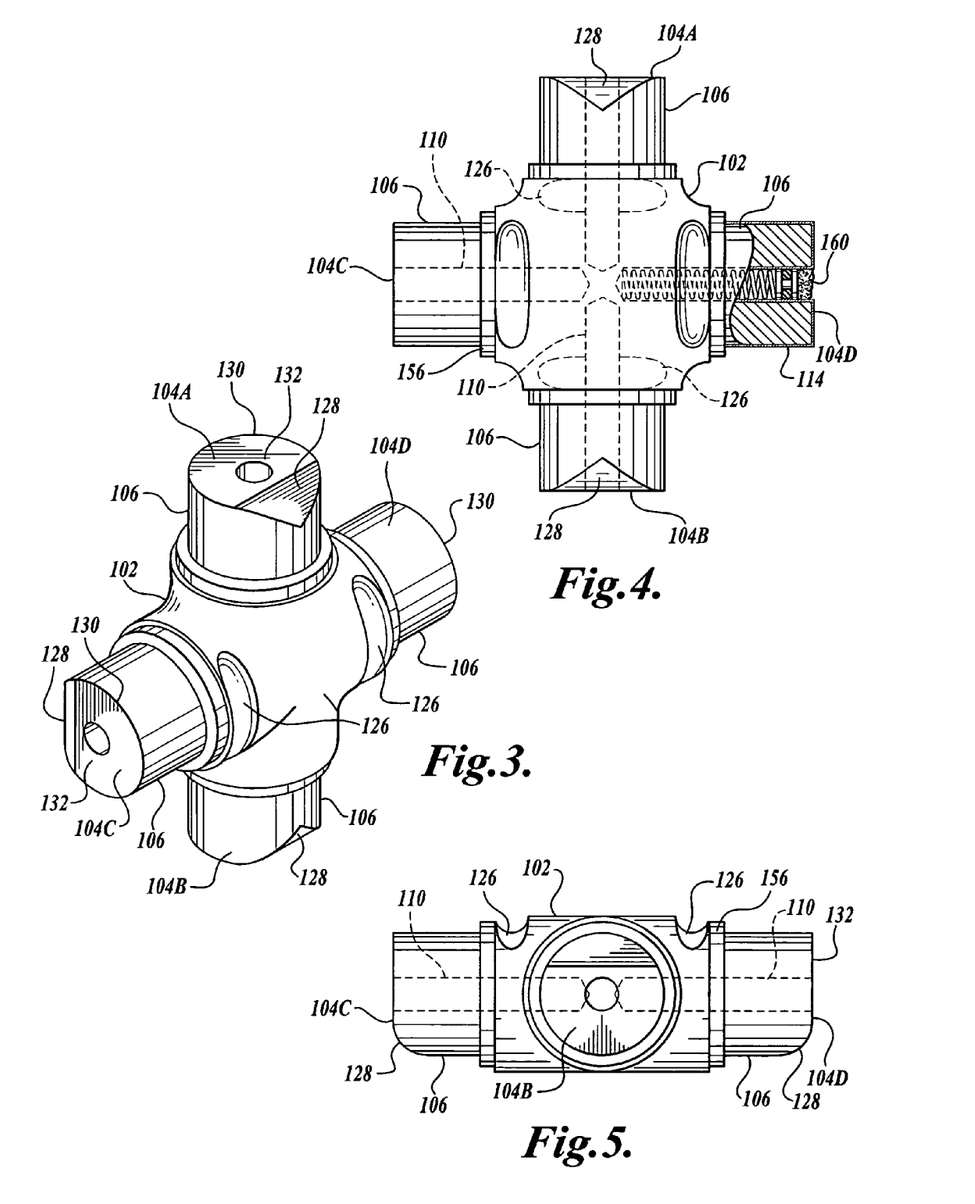
FIG. 3 is a perspective view of one embodiment of a spider formed in accordance with the present invention and suitable for use in the universal joint depicted in FIG. 2.
FIG. 4 is a planar view of the spider depicted in FIG. 3.
FIG. 5 is an elevation view of the spider depicted in FIG. 3.

FIG. 2 shows an exploded perspective view of one embodiment of a universal joint 100 formed in accordance with the present invention. The universal joint 100 is suitable for use in high load, low revolution conditions, and may be assembled within the yokes of an existing drive axle or drive line despite the enlarged size of a spider 102. Notably, the illustrated embodiment of the universal joint 100 is absent of roller needle bearings commonly found in previously developed universal joints.

Referring to FIGS. 2–5, the universal joint 100 is comprised of a main body, referred to as a cross or a spider 102, having four co-planar trunnions 104A, 104B, 104C, and 104D extending radially outward from the spider 102 at 90 degree intervals. Journals 106 are formed on the distal ends of the trunnions 104 to accept bearing cups 108 thereupon.

The bearing cups 108 are rotatingly received by the journals 106 to reduce friction as the trunnions 104 rotate within the stationary bearing cups 108. Lubricant passageways 110 are concentrically bored through each trunnion 104. A lubricant pressurization system 112 is disposed within each lubricant passageway 110 to provide a lubricant 160 at an elevated pressure to each bearing cup 108. Of note, in reference to the description of the illustrated embodiment, the elements of the trunnions 104A, 104B, 104C, and 104D, along with the bearing cups 108, lubricant passageways 110, etc., are substantially identical to one another. Therefore, where context permits, reference in the following description to one of the elements shall be understood as also referring to the other elements which are substantially identical to the described element.

During installation, a fluid pressurization system 102 is inserted within each trunnion 104. Then, a first pair of collinear trunnions 104A and 104B are inserted within the opposing bosses 22 of a first yoke 24 of a first drive shaft 26. A pair of bearing cups 108 are then inserted into the bosses 22 so as to be received upon the journals 106 of the trunnions 104A and 104B. The bearing cups 108 are secured with retaining rings 34 as is well known in the art. A second pair of collinear trunnions 104C and 104D are then inserted within opposing bosses 28 of a second yoke 30 of a second drive shaft 32. A second pair of bearing cups 108 are then inserted into the bosses 28 so as to be received upon the journals 106 of the trunnions 104C and 104D. The bearing cups 108 are secured with retaining rings 34, as is well known in the art. Once the universal joint 100 is installed, the first drive shaft 26 may rotate with two degrees of freedom relative to the second drive shaft 32, each degree of freedom defined by one of the pairs of collinear trunnions 104A and 104B or 104C and 104D. Thus, the first drive shaft 26 may rotate at an angle relative to the second drive shaft 32 during rotation of the shafts 26 and 32 without binding.

In light of the above general description of the universal joint 100, the individual components of the universal joint 100 will now be discussed in greater detail. The discussion of the components of the universal joint 100 will begin with a detailed description of the spider 102. As discussed above, the spider 102 has four co-planar trunnions 104A, 104B, 104C, and 104D extending radially outward from the spider 102 at 90 degree intervals. The trunnions 104 are machined to form precision journals 106 thereupon. The journals 106 are sized and shaped to receive close fitting bearing cups 108 thereupon. The surface of the journals 106 are preferably finished so as to have a surface finish sufficiently smooth as to be amenable to the application of a wear resistant layer 114 by an ionically bonded thin film application technique, such as Physical Vapor Deposition (PVD) or Chemical Vapor Deposition (CVD), as will be discussed in further detail below. Typically, the journals 106 are finished to have a surface smoothness of 64 microinches or less, with a preferred value of 16 microinches or less.

The wear resistant layer 114 is a solid, hard, thin-film layer applied to improve the wear resistant characteristics of the journal 106 and optionally, reduce friction. The hardness of the wear resistant layer 114 should be about 1000 Vickers or greater, with preferred values falling above approximately 2000 Vickers. Further, the wear resistant layer 114 is thin, approximately 10 microns or less, with preferred values between 2 and 6 microns.

Preferably, the wear resistant layer is applied by well known thin-film application techniques, such as through PVD or CVD coating technologies. Some suitable materials for PVD or CVD application of the wear resistant layer 114 are Chromium Nitride (CrN), Titanium Nitride (TiN), Titanium Carbonitride (TiCN), Zirconium Nitride (ZrN), Aluminum Titanium Nitride (AlTiN), Titanium Aluminum (TiAl), Zirconium Nitride (ZrN), Aluminum Oxide ($Al_2O_3$), Molybdenum Disulfide Titanium Nitride, (MoSTiN) and Carbon (C).

A stepped or shoulder portion 156 is located at the base of each trunnion 104. The stepped portion 156 is formed by stepping out the diameter of the trunnion 104, thereby forming an annular band or shoulder extending outward circumferentially around the trunnion 104. The stepped portion 156 aids in increasing the strength of the trunnion 104.

Bored concentrically through the center of each trunnion 104 is a lubricant passageway 110. Each lubricant passageway houses a lubricant pressurization system 112. Referring to FIG. 2, each lubricant pressurization system 112 includes a compressible medium, such as a spring 116, selected to bias a piston 118 outward toward the bearing cup 108. In the illustrated embodiment, a well known music wire spring is utilized. The piston 118 is formed from a rigid material, with the piston 118 of the preferred embodiment manufactured from an acetal resin, such as DUPONT DELRIN® acetal resin, a material well known in the art. The piston may have an annular exterior groove for receiving an O-ring 120 therewithin. The O-ring 120 sealingly engages the inner surface of the lubricant passageway 110, providing a pressure seal therebetween.

In operation, a lubricant 160, such as an ultra high temperature, high-pressure anti-seize lubricating grease, one suitable example being a soft metal based grease, such as a moly-graphite and/or copper-graphite based grease, is applied against the crown 122 of the piston 118. The application of the lubricant 160 in this matter causes the piston 118 to be forced inward, thereby compressing the spring 116. The lubricant 160 is applied at a sufficiently high pressure, such as about 300 psi, by a grease gun or other similar device to initially pressurize the lubricant 160 within the lubricant passageway 110. Once the pressurized grease delivery source has been removed, the spring 116, in coordination with the piston 118, biases the lubricant 160 outward toward the bearing cup 108 to supply an adequate quantity of lubricant at a sufficient pressure to the bearing cup 108. The lubricant 160 serves to reduce the wear and friction associated with the rotation of the journals 106 within the bearing cups 108.

In operation, the lubricant 160 is slowly pressed outward and eventually released from the bearing cups 108 and into the environment. Thus, fresh lubricant 160 is constantly supplied to the bearing cups 108. The pressurized supply of lubricant 160 helps to impede the entrance of contaminates into the bearing cups 108 while also aiding the removal of any contaminates that may inadvertently be present within the bearing cups 108, such as contaminates produced from the wear of the components of the universal joint 100. Further, while the pressurization system 112 aids in replenishing any lubricant 160 consumed or released from the bearing cups 108, the high pressure of the lubricant aids in lubricating the bearing cups 108 and the trunnions 104 as they rotate relative to one another, even at low RPMs.

More specifically, in previously developed universal joints, centrifugal forces exerted upon the lubricant during rotation of the universal joint were often relied upon to deliver the lubricant to the bearing cups. However, in high load, low RPM situations, this has been found to be inadequate. In contrast, the lubricant pressurization system 112 of the present invention delivers a lubricant 160 at an elevated pressure, such as about 300 psi, independent of the RPM of the universal joint 100. Further, even at high RPM, centrifugal forces can not be depended upon to provide lubricant at sufficiently high pressures to force the lubricant between the load bearing surfaces of the universal joint when subjected to high loads. In the illustrated embodiment, the lubricant is pressurized to a sufficient degree to allow the lubricant to infiltrate the annulus formed between the bearing cups 108 and the journals 106 under high load conditions. Preferably, the lubricant 160 is pressurized between 100 PSI and 600 PSI, with a preferred value of 300 PSI.

Figure 8:
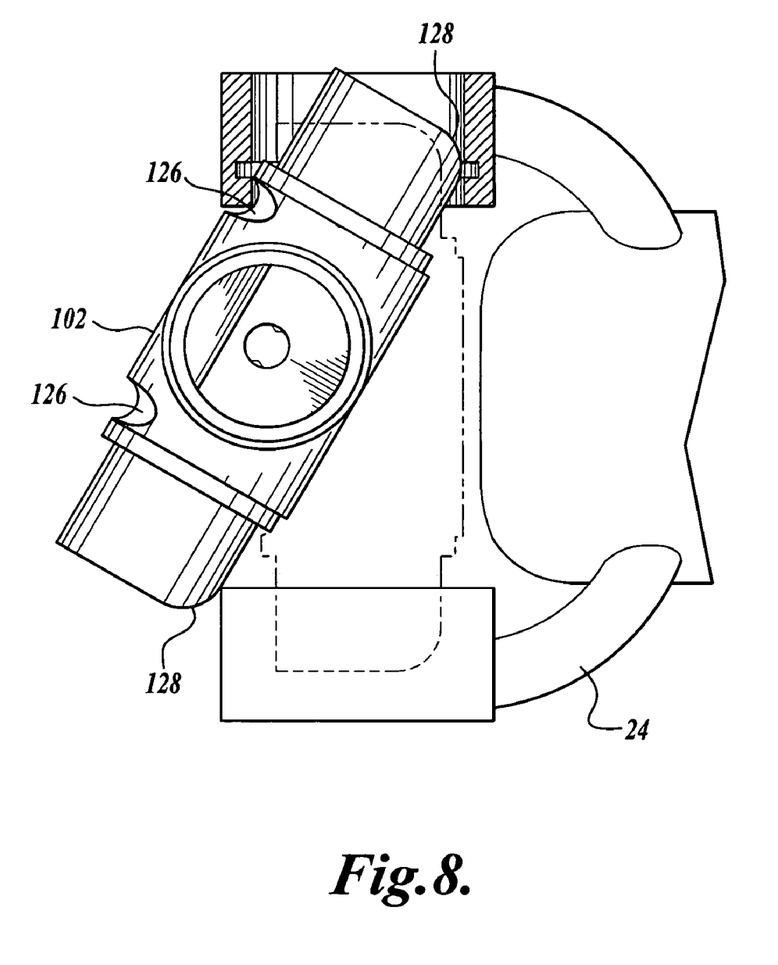
FIG. 8 is an elevation view of the spider depicted in FIG. 3, the spider shown as the spider is inserted within a yoke, illustrating how a radiused surface and a clearance cut disposed on the spider aid in providing clearance during the insertion of the spider within the yoke.

The spider 102 of the illustrated embodiment of the present invention is modified to allow an enlarged spider to be installed within the existing, i.e. stock sized, yokes of drive axles and drive lines. In this regard, clearance cuts or notches 126 may be cut or otherwise formed transversely across the main body of the spider 102 near the base of the trunnions 104. The clearance notches 126 are oriented perpendicular to the axis of the trunnion 104 located adjacent to the clearance notch 126. A pair of parallel oriented clearance notches 126 may be formed on a first side of the spider 102, positioned at the base of a first pair of collinear trunnions 104C and 140D to assist in inserting the spider 102 within a first yoke. A second pair of parallel oriented clearance notches 126 may be formed on a second side of the spider 102, positioned at the bases of a second pair of collinear trunnions 104C and 104D to assist in inserting the spider 102 within a second yoke. In the illustrated embodiment, the clearance notches 126 define an elliptical shape due to the fact that the notches are formed across the cylindrical shape of the trunnion bases. However, as should be apparent to one skilled in the art, the cut path should be selected to best match the geometry of the yoke 24 during insertion of the spider 102 within the yoke 24, as shown in FIG. 8, and therefore is not restricted to a specific elliptic cut path or even an elliptic cut path.

To further assist in inserting the enlarged spider 102 within a yoke, the outer ends of the journals 106 may be radiused or chamfered. More specifically, a portion of a circular edge 130 formed at the interface of the cylindrically shaped journals 106 and the circular end face 132 is relieved with a clearance radius 128 to provide additional clearance during insertion of the spider 102 in a yoke 24, as depicted in FIG. 8. In the illustrated embodiment, the clearance radius 128 is shown as curvilinear in shape. Although the clearance radius 128 is described and shown with particularity, it should be apparent to one skilled in the art that the clearance radius 128 may be formed in any number of ways. Moreover, the shape of the clearance radius 128 should be selected to best match the geometry of the yoke 24 during insertion of the spider 102 within the yoke 24, as shown in FIG. 8, as should be apparent to one skilled in the art.

Figure 6:
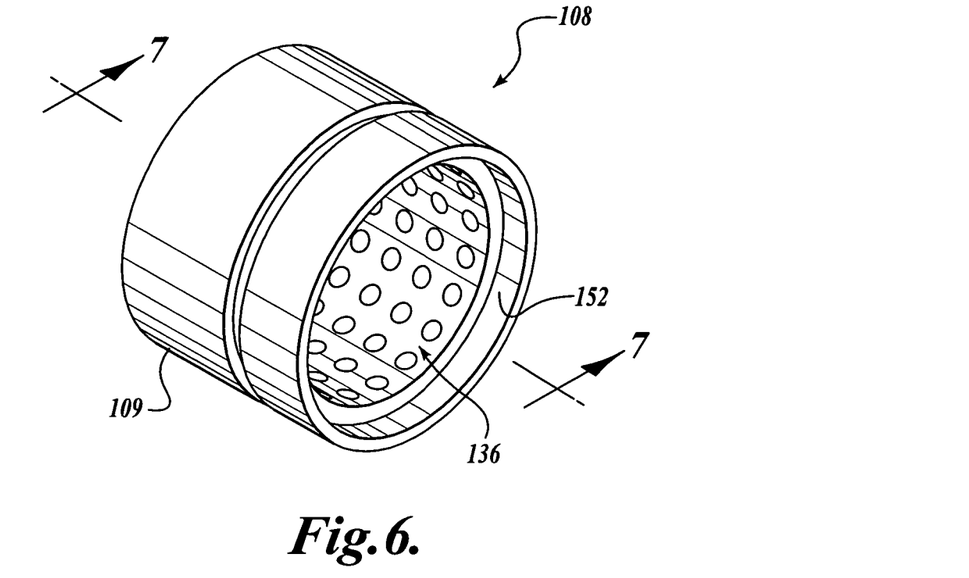
FIG. 6 is a perspective view of one embodiment of a bearing cup formed in accordance with the present invention and suitable for use in the universal joint depicted in FIG. 2, the bearing cap depicted with a textured inner surface.
Figure 7:
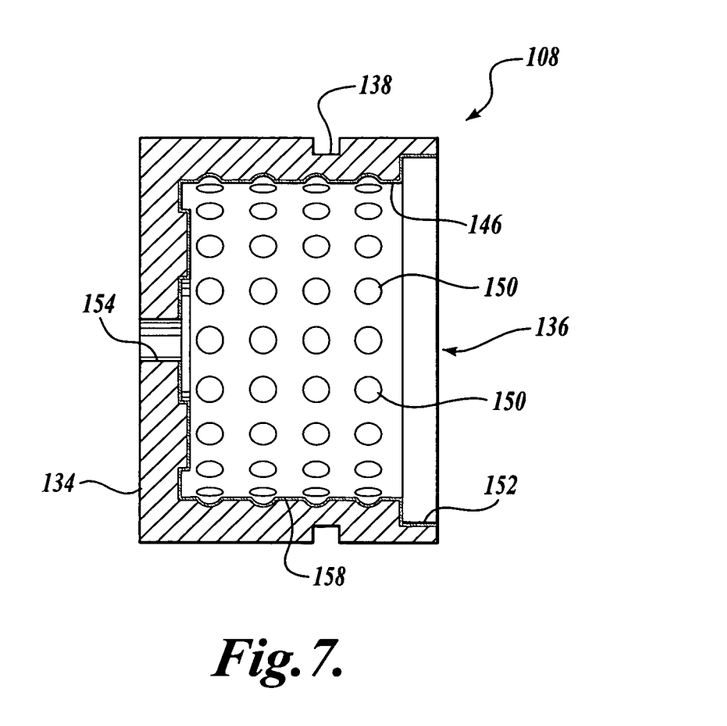
FIG. 7 is a cross-sectional view of the bearing cup depicted in FIG. 6, the cross-sectional cut taken substantially through Section 7—7 of FIG. 6.

Referring to FIGS. 2, 6, and 7, one embodiment of a bearing cup 108 formed in accordance with the present invention will now be described in greater detail. The bearing cup 108 may be formed in the shape of a cylinder 109 having a closed end 134 and an opposed open end 136. Disposed circumferentially about the exterior of the cylinder 109 is an annular groove 138 sized to receive a well known retaining ring 34 therein. Bored or otherwise formed through the closed end 134 is a threaded zerk or lubricant fitting mounting aperture 154 sized to receive a zerk or lubricant fitting 142 therein. The interior surface 146 of the cylinder 109 may be textured. In the illustrated embodiment, the textured interior surface 146 includes a plurality of dimples 150. The dimples 150 serve to store pockets of lubricant therein to assist in maintaining a sufficient supply of lubricant disposed between the bearing cups 108 and the journals 106. Although the textured interior surface 146 of the illustrated embodiment of the bearing cup 108 is textured through the application of a plurality of dimples 150, it should be apparent to one skilled in the art that the surface may be textured in other suitable manners such as would retain lubricant thereupon.

The diameter of the inner surface 146 of the cylinder 109 is stepped outward adjacent to the open end 136, thereby creating a channel 152 for receiving the shoulder portion 156 (see FIG. 4) of the trunnion 104.

The inner surface 146 of the cylinder 109 may be finished so as to have a surface finish sufficiently smooth as to be amendable to the application of a wear resistant layer 158 by a thin film application technique, such as PVD, as will be discussed in further detail below. The inner surface 146 of the bearing cups 108 are finished to have a surface smoothness of 64 microinches, with a preferred value of 16 microinches or less. The wear resistant layer 158 is a solid, hard, thin-film layer applied to improve the wear resistant characteristics of the inner surface 146 of the bearing cup 108 and optionally, reduce friction. The hardness of the layer should be about 1000 Vickers or greater, with preferred values falling above about 2000 Vickers. Further, the wear resistant layer 158 is thin, approximately 10 microns or less, with preferred values between 2 and 6 microns.

Preferably, the wear resistant layer is applied by well known ionically bonded thin-film application techniques, such as through PVD or CVD coating technologies as described above.

Figure 9:
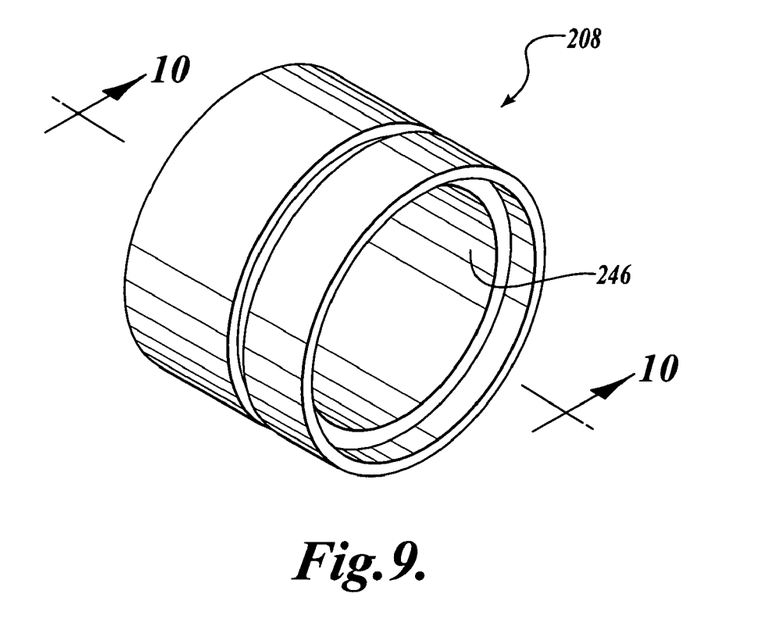
FIG. 9 is a perspective view of an alternate embodiment of a bearing cup formed in accordance with the present invention and suitable for use in the universal joint depicted in FIG. 2, the bearing cup depicted with a smooth inner surface.
Figure 10:
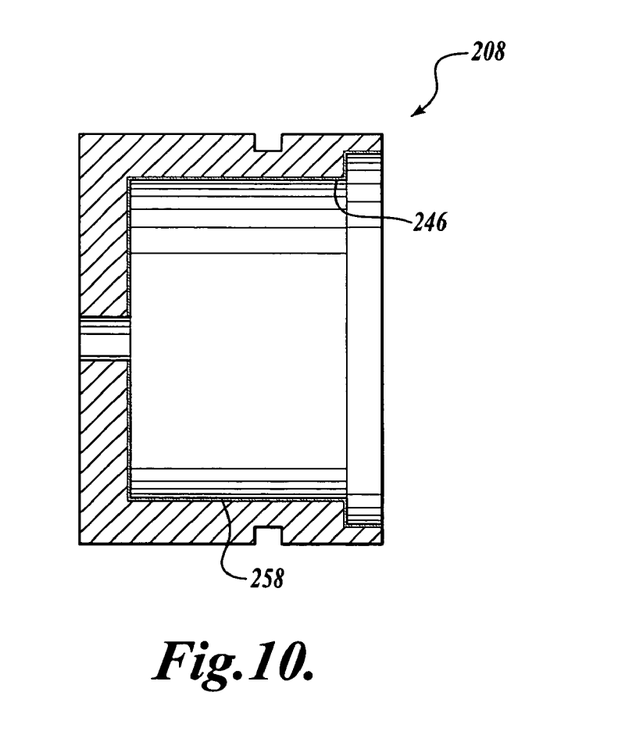
FIG. 10 is a cross-sectional view of the bearing cup depicted in FIG. 9, the cross-sectional cut taken substantially through Section 10—10 of FIG. 9.

FIGS. 9 and 10, show an alternate embodiment of a bearing cup 208 formed in accordance with the present invention and suitable for use with the spiders 102, 302, and 402 depicted in FIGS. 3–5, 11, and 12. The bearing cup 208 may be substantially similar to the bearing cup 108 depicted in FIGS. 6 and 7, with the exception that the inner surface 246 of the bearing cup 208 is smooth. Like the embodiment of the bearing cup 108 depicted in FIGS. 6 and 7, the inner surface 246 includes a wear-resistant layer 258, substantially similar to the wear-resistant layer 158 described above.

Figure 11:
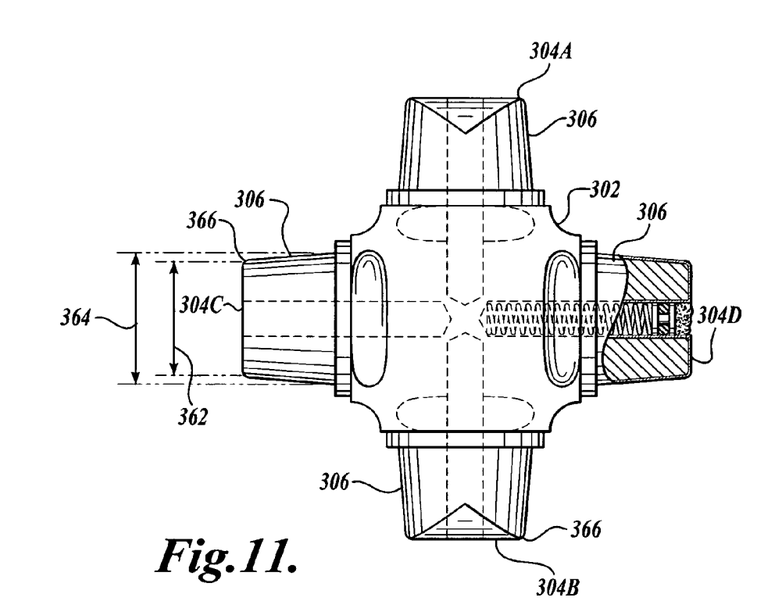
FIG. 11 is a planar view of an alternate embodiment of a spider formed in accordance with the present invention, the spider having trunnions with journal surfaces which taper linearly inward toward the distal ends of the trunnions.

Referring to FIG. 11, an alternate embodiment of a spider 302 formed in accordance with the present invention is illustrated. The spider 302 is substantially similar to the spider 102 depicted in FIGS. 3–5, with the exception of the journals 306, which are tapered. More specifically, the journals 306 are formed in the shape of a truncated cone that tapers inward toward the distal end of the trunnions 304A, 304B, 304C, and 304D, such that the base of the journal 306 is of a greater diameter than the diameter of the journal 306 measured at its distal end. The amount of taper depicted in FIG. 11 is exaggerated to illustrate the concept. In one actual embodiment of the spider 302, the diameter of the base of the journal 306, represented by the arrow indicated by reference numeral 364, may be about 0.002" greater than the diameter of the journal 306 measured at the distal end of the journal 306, as represented by the arrow indicated by reference numeral 362. Although a specific amount of taper is disclosed for the illustrated embodiment, it should be apparent to one skilled in the art the amount of taper may be varied from the amount disclosed while remaining within the scope of the present invention.

In addition to the tapering of the trunnions 304, an outer edge 366 of the end surface of the trunnion is radiused. The size of the radius depicted in FIG. 11 is exaggerated to illustrate the concept. For instance, in one embodiment of the spider 302, the outer edge 366 may be comprised of about a 0.06" radius. Although a specific radius is disclosed above, it should be apparent to one skilled in the art that the length of the radius may vary from the length disclosed while remaining within the scope of the present invention.

The tapering of the journal 306 and the radiusing of the outer edge 366 of the end surface aids in increasing the longevity of the universal joint. More specifically, under full load torque, a bearing cup rotatingly received upon the trunnion 304 tends to cant and/or deform under the full load torque. The tapering of the journal 306 and radiusing of the outer edge 366 decreases wear under these conditions by impeding the outer edge 366 from digging into the bearing cup as the bearing cup cants upon the trunnion 304. Also, by tapering the trunnions 306, and by radiusing the circular edge 330, the load may be spread more evenly along the journal surface 306 since the journal surface 306 is tapered to match the cant of the bearing cup under full load torque. It is to be understood that the tapering of the journal 306 and the radiusing of the outer edge 366 may be employed individually or in combination upon any of the spiders disclosed herein.

Figure 12:
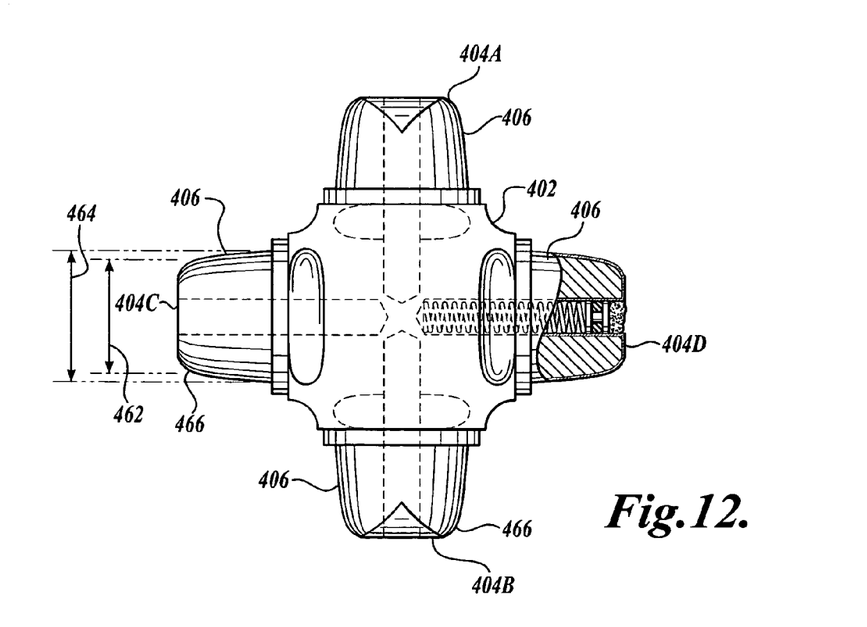
FIG. 12 is a planar view of a further alternate embodiment of a spider formed in accordance with the present invention, the spider having trunnions with journal surfaces which taper arcuately inward toward the distal ends of the trunnions.

Referring to FIG. 12, a second alternate embodiment of a spider 402 formed in accordance with the present invention is depicted. The second alternate embodiment depicted in FIG. 12 is similar to the alternate embodiment depicted in FIG. 11 with the exception of the manner of tapering of the journals 406. The journals 406 of the second alternate embodiment are tapered in an arcuate manner such that the journals 406 are shaped so as to represent the upper half of a barrel. Like the embodiment depicted in FIG. 11, a circular edge 466 of an end surface of the trunnions 404A, 404B, 404C, and 404D may be radiused. Although a specific shape is described for providing the arcuate taper, it should be apparent to one skilled in the art that additional arcuate shapes are suitable for use with and within the scope of the present invention.

Of note, the amount of taper depicted in FIG. 12 is exaggerated to illustrate the concept. In one embodiment of the spider 402, the diameter of the base of the journal 406, represented by the arrow indicated by reference numeral 464, may be about 0.002" greater than the diameter of the journal 406 measured at the distal end of the journal 406, as represented by the arrow indicated by reference numeral 462. Although a specific amount of taper is disclosed for the illustrated embodiment, it should be apparent to one skilled in the art the amount of taper may be varied from the amount disclosed while remaining within the scope of the present invention.

Likewise, the size of the radius depicted in FIG. 12 is exaggerated to illustrate the concept. For instance, in one actual embodiment of the spider 402, the outer edge 466 may be comprised of about a 0.060"radius. Although a specific radius is disclosed above, it should be apparent to one skilled in the art that the length of the radius may vary from the length disclosed while remaining within the scope of the present invention.

Although the illustrated embodiments are depicted with a wear resistant layer on both the trunnions and on the bearing cups, it should be apparent to those skilled in the art that the wear resistant layer may be disposed solely on the trunnions or solely on the bearing cups, without departing from the spirit and scope of the present invention.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A universal joint comprising;
   (a) a spider having at least one trunnion projecting outward from the spider;
   (b) a bearing disposable on a distal end of the trunnion;
   (c) a lubricant passageway disposed within the trunnion and in fluid communication with the bearing; and
   (d) a lubricant delivery system disposed within the spider and adaptable to engage and to urge a lubricant present within the lubricant passageway toward the bearing while the spider is stationary and while the spider is rotating.

2. The universal joint of claim 1, wherein the trunnion is tapered toward the distal end of the trunnion.

3. The universal joint of claim 2, wherein the trunnion is tapered in a substantially linear manner.

4. The universal joint of claim 2, wherein the trunnion is tapered in a substantially arcuate manner.

5. The universal joint of claim 1, wherein an outer edge of an end surface of the trunnion is radiused.

6. The universal joint of claim 1, wherein the lubricant delivery system is operable to pressurize the lubricant when present within the lubricant passageway to a selected pressure within the range of about 100 and about 600 PSI.

7. The universal joint of claim 1, wherein the lubricant delivery system comprises a resilient member adaptable to act upon the lubricant to pressurize the lubricant.

8. The universal joint of claim 1, wherein the lubricant delivery system comprises a compressible medium expandable to maintain the lubricant in the lubricant passageway at an elevated pressure as the lubricant is consumed.

9. The universal joint of claim 1, wherein the bearing is further comprised of a load carrying surface for engagement with the trunnion, wherein the load carrying surface is comprised of a wear resistant material.

10. The universal joint of claim 9, wherein the wear resistant material is ionically bonded to the bearing.

11. The universal joint of claim 9, wherein the wear resistant material comprises a material selected from the group consisting of chromium nitride, titanium nitride, titanium carbonitride, zirconium nitride, aluminum titanium nitride, titanium aluminum, zirconium nitride, aluminum oxide, and carbon.

12. The universal joint of claim 9, further comprising an interface surface for receiving the wear resistant material, wherein the interface surface has a surface smoothness of 64 microinches or less.

13. The universal joint of claim 1, wherein the bearing is further comprised of a load carrying surface for engagement with the trunnion, wherein the load carrying surface is textured to retain a lubricant thereupon.

14. The universal joint of claim 13, wherein the textured surface is comprised of a plurality of dimples.

15. The universal joint of claim 1, wherein the trunnion includes a surface for receiving the bearing comprising a wear resistant material.

16. The universal joint of claim 15, wherein the wear resistant material is ionically bonded to the trunnion.

17. The universal joint of claim 15, wherein the wear resistant material comprises a material selected from the group consisting of chromium nitride, titanium nitride, titanium carbonitride, zirconium nitride, aluminum titanium nitride, titanium aluminum, zirconium nitride, aluminum oxide, and carbon.

18. The universal joint of claim 1, wherein the spider further comprises a plurality of cuts positioned on the outer surface of the spider to provide additional clearance during installation of the universal joint upon a yoke.

19. The universal joint of claim 1, wherein the distal end of the trunnion comprises a clearance radius to provide additional clearance during installation of the universal joint upon a yoke.

20. The universal joint of claim 1, wherein the bearing further comprises an aperture for permitting the insertion of a lubricant therethrough.

21. The universal joint of claim 1, wherein an annulus formed between the bearing and the trunnion when the bearing is disposed on the distal end of the trunnion is absent of needle bearings.

22. The universal joint of claim 1, wherein the bearing includes a cavity having an inner surface, wherein a majority of the inner surface engages the trunnion.

23. A universal joint comprising:
   (a) a spider comprising at least one trunnion extending outward from the spider, wherein the trunnion is tapered toward the distal end of the trunnion; and
   (b) a bearing adapted to be rotatably engaged by the trunnion, the bearing having a load carrying surface disposed to engage the trunnion, wherein the load carrying surface is not correspondingly tapered to match the taper of the trunnion such that the bearing is operable to cant upon the trunnion under load.

24. The universal joint of claim 23, wherein the trunnion is tapered along a majority of the length of the trunnion.

25. The universal joint of claim 23, wherein the wear resistant material comprises a material selected from the group consisting of chromium nitride, titanium nitride, titanium carbonitride, zirconium nitride, aluminum titanium nitride, titanium aluminum, zirconium nitride, aluminum oxide, and carbon.

26. The universal joint of claim 23, wherein the load carrying surface of the bearing is textured to retain a lubricant thereupon.

27. The universal joint of claim 23, wherein the trunnion is tapered in a substantially arcuate manner.

28. The universal joint of claim 23, wherein the portions of the bearing in engagement with the load carrying surface have a surface smoothness of 64 microinches or less.

29. The universal joint of claim 23, wherein the bearing further comprises an aperture for permitting the insertion of a lubricant into the bearing.

30. The universal joint of claim 23, wherein an annulus formed between the bearing and the trunnion when the bearing is disposed on the distal end of the trunnion is absent of needle bearings.

31. The universal joint of claim 23, wherein the bearing includes a cavity having an inner surface, wherein a majority of the inner surface engages the trunnion.

32. A spider for a universal joint devoid of needle bearings comprising:
   (a) a least one trunnion projecting outward from the spider; and
   (b) a journal disposed on the trunnion for receiving a bearing thereupon, wherein the journal is tapered toward a distal end of the trunnion along a majority of the length of the journal to permit the bearing to cant under load upon the trunnion.

33. The spider of claim 32, journal includes an outer surface comprising a wear resistant material, the wear resistant material adapted to permit the bearing to ride upon the trunnion without needle bearings disposed between the bearing and the trunnion.

34. The spider of claim 33, wherein the wear resistant material comprises a material selected from the group consisting of chromium nitride, titanium nitride, titanium carbonitride, zirconium nitride, aluminum titanium nitride, titanium aluminum, zirconium nitride, aluminum oxide, and carbon.

35. The spider of claim 33, further comprising a layer of soft metal based grease disposed over the wear resistant material.

36. The spider of claim 35, wherein the layer of soft metal based grease includes a copper-graphite based grease.

37. The spider of claim 32, wherein the journal has been chamfered to provide additional clearance during installation of the universal joint upon a yoke.

38. The spider of claim 32, wherein the bearing is not tapered such that a separation distance between opposing surfaces of the bearing and the journal which is tapered increases toward the distal end of the trunnion permitting the bearing to cant under load.

39. The spider of claim 38, wherein the journal is tapered in a substantially linear manner.

40. The spider of claim 38, wherein the journal is tapered in a substantially arcuate manner to accommodate flexing and canting of the bearing on the journal when the spider is loaded.

41. The snider of claim 32, wherein an outer edge of an end surface of the trunnion is radiused.

42. A spider of a universal joint comprising:
   (a) at least one trunnion projecting outward from the center of the spider, the trunnion having a lubricant passageway; and
   (b) a lubricant delivery device disposed within the spider and in fluid communication with the lubricant passageway, wherein the lubricant delivery device is operable to engage and pressurize a lubricant present in the lubricant passageway to assist in driving the lubricant through the passageway while the spider is stationary and while the spider is rotating.

43. The spider of claim 42, wherein the lubricant delivery device comprises a spring adaptable to act upon the lubricant to pressurize the lubricant.

44. The spider of claim 42, wherein the lubricant delivery device comprises a compressible device expandable to maintain the lubricant under pressure as the lubricant is consumed.

45. The spider of claim 42, wherein a distal end of the trunnion comprises a clearance radius to provide additional clearance during installation of the universal joint upon a yoke.

46. The spider of claim 42, wherein the lubricant delivery device is operable to pressurize the lubricant at a selected pressure within the range of about 100 PSI to 600 PSI.

47. The universal joint of claim 30, wherein the annulus formed between the bearing and the trunnion when the bearing is disposed on the distal end of the trunnion is absent of bushings.

48. The universal joint of claim 33, wherein the wear resistant material is adapted to permit the bearing to ride upon the trunnion without bushings disposed between the bearing and the trunnion.

* * * * *

UNITED STATES PATENT AND TRADEMARK OFFICE
CERTIFICATE OF CORRECTION

PATENT NO. : 6,881,151 B1
DATED : April 19, 2005
INVENTOR(S) : C. Jantz et al.

It is certified that error appears in the above-identified patent and that said Letters Patent is hereby corrected as shown below:

Title page,
Item [75], Inventors, "Everett," should read -- Snohomish, --

Column 10,
Line 63, "32, journal" should read -- 32, wherein the journal --

Column 11,
Line 26, "snider" should read -- spider --

Signed and Sealed this

Nineteenth Day of July, 2005

JON W. DUDAS
*Director of the United States Patent and Trademark Office*